(12) United States Patent
Bogdany et al.

(10) Patent No.: US 9,153,049 B2
(45) Date of Patent: Oct. 6, 2015

(54) RESOURCE PROVISIONING USING PREDICTIVE MODELING IN A NETWORKED COMPUTING ENVIRONMENT

(75) Inventors: Richard J. Bogdany, Durham, NC (US); Thomas B. Harrison, Holly Springs, NC (US); Cameron Naill-Kerr McAvoy, Rockford, MI (US); Brian M. O'Connell, Research Triangle Park, NC (US); Herbert D. Pearthree, Cary, NC (US); Shengzhi Sun, Dublin, OH (US); Clay T. Upton, Lincoln, NE (US)

(73) Assignee: International Business Machines Corporation, Armonk, NY (US)

( * ) Notice: Subject to any disclaimer, the term of this patent is extended or adjusted under 35 U.S.C. 154(b) by 622 days.

(21) Appl. No.: 13/593,920

(22) Filed: Aug. 24, 2012

(65) Prior Publication Data

US 2014/0055458 A1    Feb. 27, 2014

(51) Int. Cl.
    *G06T 11/20*    (2006.01)
(52) U.S. Cl.
    CPC ............. *G06T 11/206* (2013.01); *G06T 11/203* (2013.01)
(58) Field of Classification Search
    CPC .......................... G06T 11/206; G06T 11/203
    USPC ................... 345/440, 440.1, 440.2, 441, 442
    See application file for complete search history.

(56) References Cited

U.S. PATENT DOCUMENTS

| | | | |
|---|---|---|---|
| 5,093,912 | A | 3/1992 | Dong et al. |
| 5,317,726 | A | 5/1994 | Horst |
| 6,006,223 | A | 12/1999 | Agrawal et al. |
| 6,076,133 | A | 6/2000 | Brainard et al. |
| 6,374,227 | B1 | 4/2002 | Ye |
| 6,577,323 | B1 | 6/2003 | Jamieson et al. |
| 6,625,577 | B1 | 9/2003 | Jameson |
| 7,516,457 | B2 | 4/2009 | Eilam et al. |
| 7,558,864 | B2 | 7/2009 | Kalantar et al. |
| 7,577,722 | B1 | 8/2009 | Khandekar et al. |
| 7,636,779 | B2 | 12/2009 | Hayashi et al. |
| 7,680,770 | B1 | 3/2010 | Buyukkokten et al. |
| 7,809,831 | B2 | 10/2010 | Matsumitsu et al. |
| 8,024,433 | B2 | 9/2011 | Mason et al. |

(Continued)

OTHER PUBLICATIONS

Maitland, J., "Keeping Control Isn't Easy", Chapter 4: Cloud-Based Infrastructure, SearchCloudComputing.com, 13 pages. No publication date cited in the article, Oct . 2009.

(Continued)

*Primary Examiner* — Jin-Cheng Wang
(74) *Attorney, Agent, or Firm* — William E. Schiesser; Keohane & D'Alessandro PLLC; Hunter E. Webb

(57) ABSTRACT

An approach is provided for allowing a network computing (e.g., cloud computing) infrastructure to modify its resource allocation plan (e.g., an instance count) by using a Kth derivative vector plot, which may be generated using historical logs. Among other things, this approach enables an infrastructure to project an allocation forecast for a specified duration and adapt to changes in network traffic.

22 Claims, 7 Drawing Sheets

(56) References Cited

U.S. PATENT DOCUMENTS

| | | | |
|---|---|---|---|
| 2004/0109603 A1* | 6/2004 | Bitter et al. | 382/154 |
| 2006/0159014 A1 | 7/2006 | Breiter et al. | |
| 2007/0214455 A1 | 9/2007 | Williams et al. | |
| 2009/0027398 A1* | 1/2009 | Frisken | 345/442 |
| 2009/0276771 A1 | 11/2009 | Nickolov et al. | |
| 2009/0282404 A1 | 11/2009 | Khandekar et al. | |
| 2010/0131385 A1 | 5/2010 | Harrang et al. | |
| 2011/0040536 A1* | 2/2011 | Levitan | 703/2 |
| 2011/0138047 A1 | 6/2011 | Brown et al. | |
| 2012/0058775 A1* | 3/2012 | Dupray et al. | 455/456.1 |
| 2013/0100138 A1* | 4/2013 | Moriyama et al. | 345/442 |

OTHER PUBLICATIONS

Mell, P. et al., "The NIST Definition of Cloud Computing", National Institute of Standards and Technology, Information Technology Laboratory, Version 15, Oct. 7, 2009, 2 pages.

Pant, P., "Provisioning in the Cloud with Point-and-Click Simplicity Using Your Existing Data Center Tools", cloudswitch.com/blog/tag/new, Jan. 11, 2011, 4 pages.

Zhu, J. et al., "Twinkle: A Fast Resource Provisioning Mechanism for Internet Services," Zhenxiao.com, pp. 1-9. No publication date cited in the article, 2011.

"Runge-Kutta methods", from Wikipedia, the free encyclopedia, 12 pages. No publication date cited in the article, Jul. 2012.

\* cited by examiner

US 9,153,049 B2

RESOURCE PROVISIONING USING PREDICTIVE MODELING IN A NETWORKED COMPUTING ENVIRONMENT

TECHNICAL FIELD

Embodiments of the present invention relate to computing resource allocation in a networked computing environment (e.g., a cloud computing environment). Specifically, embodiments of the present invention relate to the utilization of historical web access logs and generation of a derivative vector plot (e.g., $K^{th}$ derivative vector plot) that is used to provide forecasts of future events.

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Cloud services may be rendered through dynamic infrastructure provisioning. For example, within a relatively static hardware pool, operating systems and applications may be deployed and reconfigured to meet dynamic customer computational demands. Within a cloud environment's boundaries, images may be installed and overwritten, Internet Protocol (IP) addresses may be modified, and real and virtual processors may be allocated to meet changing business needs. Challenges may exist, however, in providing an infrastructure that is capable of modifying its resource allocation plan/protocol in response to changing demands.

SUMMARY

Embodiments of the present invention provide an approach for allowing a network computing (e.g., cloud computing) infrastructure to modify its resource allocation plan (e.g., an instance count) by using a $K^{th}$ derivative vector plot, which may be generated using historical logs. Among other things, this approach enables an infrastructure to project an allocation forecast for a specified duration and adapt to changes in network traffic.

A first aspect of the present invention provides a computer-implemented method for provisioning computing resources using predictive modeling in a networked computing environment, comprising: accessing a set of graphical curves of network data traffic versus time, the set of graphical curves being stored in at least one computer storage device; segmenting the set of graphical curves into a set of predetermined time intervals to yield a set of time interval curves; overlaying and fitting the set of time interval curves to yield a set of best fit overlaying curves; generating a derivative vector plot based on a set of data points of the set of best fit overlaying curves; and forecasting network traffic in the networked computing environment based on the derivative vector plot.

A second aspect of the present invention provides a system for provisioning computing resources using predictive modeling in a networked computing environment, comprising: a memory medium comprising instructions; a bus coupled to the memory medium; and a processor coupled to the bus that when executing the instructions causes the system to: access a set of graphical curves of network data traffic versus time, the set of graphical curves being stored in at least one computer storage device; segment the set of graphical curves into a set of predetermined time intervals to yield a set of time interval curves; overlay and fit the set of time interval curves to yield a set of best fit overlaying curves; generate a derivative vector plot based on a set of data points of the set of best fit overlaying curves; and forecast network traffic in the networked computing environment based on the derivative vector plot.

A third aspect of the present invention provides a computer program product for provisioning computing resources using predictive modeling in a networked computing environment, the computer program product comprising a computer readable storage media, and program instructions stored on the computer readable storage media, to: access a set of graphical curves of network data traffic versus time, the set of graphical curves being stored in at least one computer storage device; segment the set of graphical curves into a set of predetermined time intervals to yield a set of time interval curves; overlay and fit the set of time interval curves to yield a set of best fit overlaying curves; generate a derivative vector plot based on a set of data points of the set of best fit overlaying curves; and forecast network traffic in the networked computing environment based on the derivative vector plot.

A fourth aspect of the present invention provides a method for deploying a system for provisioning computing resources using predictive modeling in a networked computing environment, comprising: providing a computer infrastructure being operable to: access a set of graphical curves of network data traffic versus time, the set of graphical curves being stored in at least one computer storage device; segment the set of graphical curves into a set of predetermined time intervals to yield a set of time interval curves; overlay and fit the set of time interval curves to yield a set of best fit overlaying curves; generate a derivative vector plot based on a set of data points of the set of best fit overlaying curves; and forecast network traffic in the networked computing environment based on the derivative vector plot.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION

Figure 1:
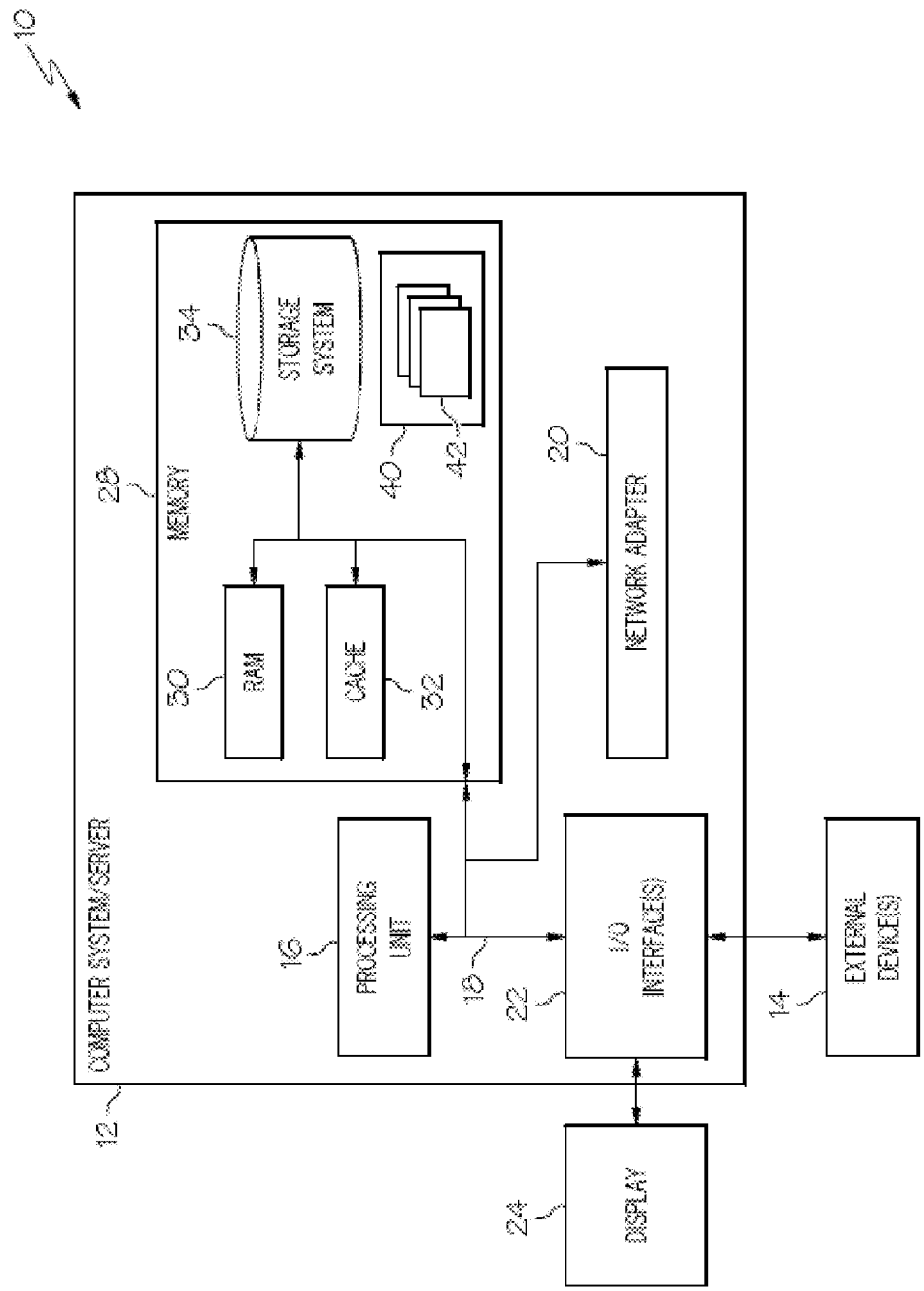
FIG. 1 depicts a cloud computing node according to an embodiment of the present invention.

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for allowing a network computing (e.g., cloud computing) infrastructure to modify its resource allocation plan (e.g., an instance count) by using a $K^{th}$ derivative vector plot, which may be generated using historical logs. Among other things, this approach enables an infrastructure to project an allocation forecast for a specified duration and adapt to changes in network traffic.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
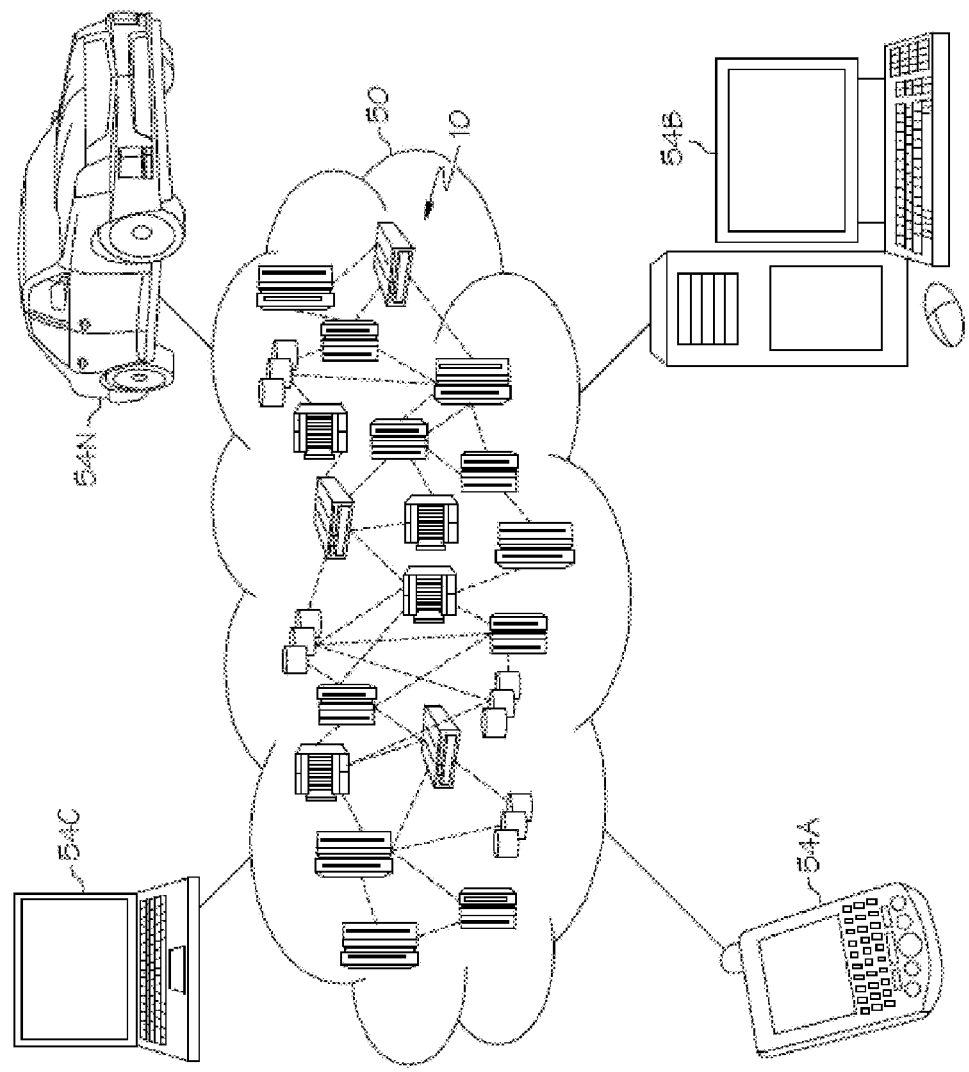
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
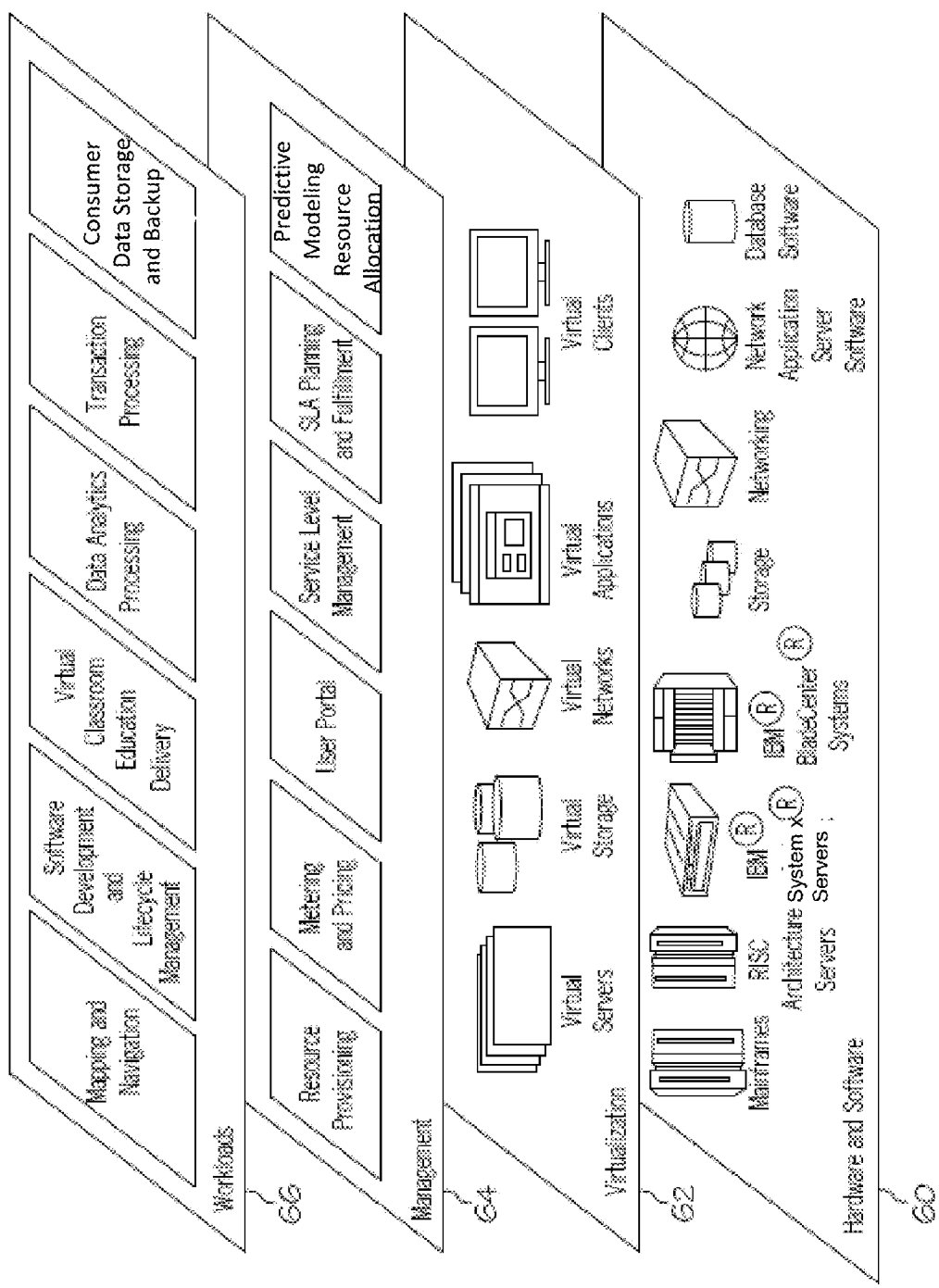
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is predictive modeling(-based) resource allocation, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the predictive modeling resource allocation functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
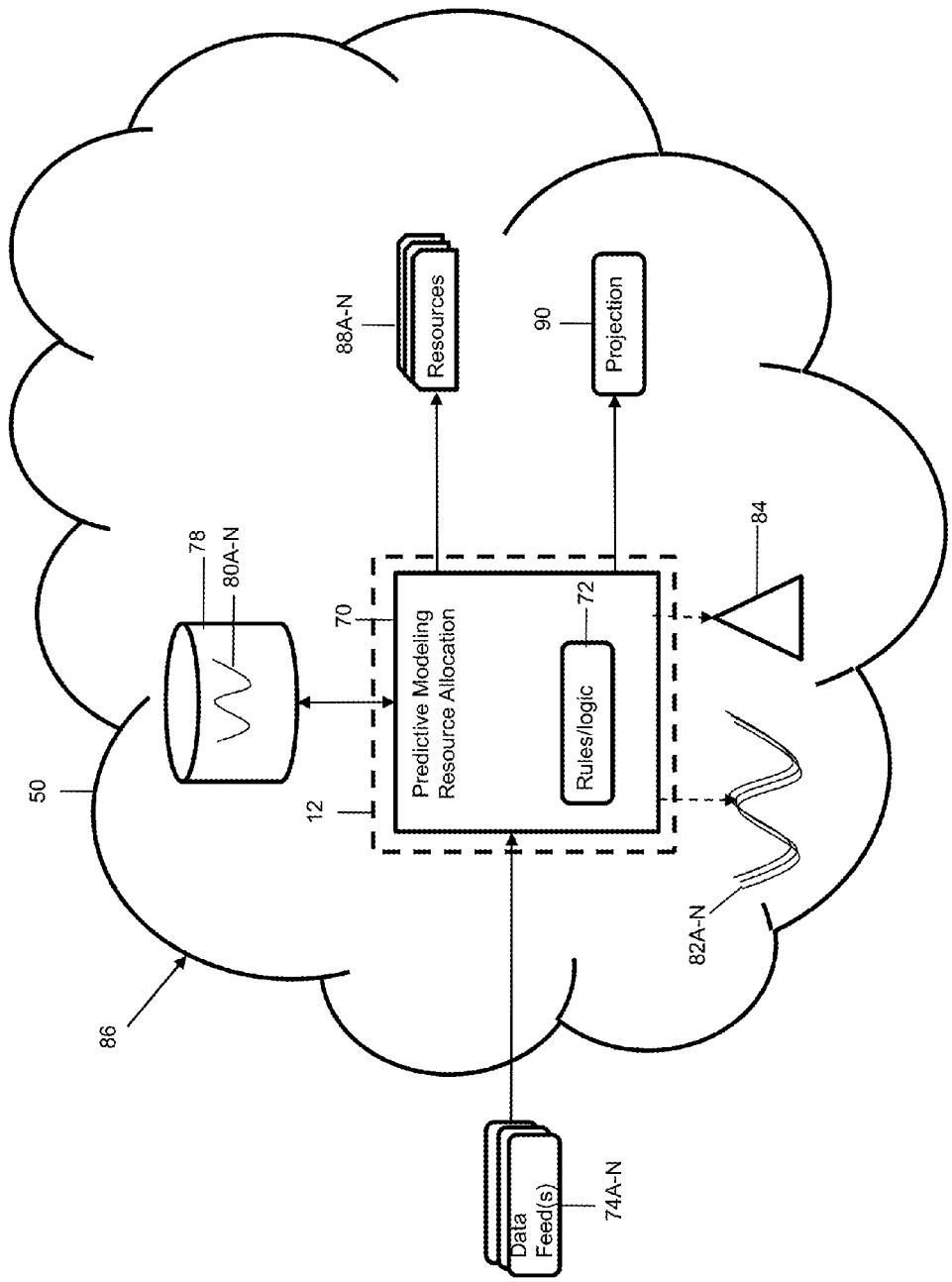
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 86 (e.g., a cloud computing environment 50). A computer system/server 12, which can be implemented as either a stand-alone computer system or as a networked computer system is shown in FIG. 4. In the event the teachings recited herein are practiced in a networked computing environment 86, each client need not have a predictive modeling resource allocation engine (engine 70). Rather, engine 70 could be loaded on a server or server-capable device that communicates (e.g., wirelessly) with the clients to provide predictive modeling-based resource allocation therefor. Regardless, as depicted, engine 70 is shown within computer system/server 12. In general, engine 70 can be implemented as program/utility 40 on computer system 12 of FIG. 1 and can enable the functions recited herein. As further shown, engine 70 (in one embodiment) comprises a rules and/or computational engine that processes a set (at least one) of rules/logic 72 and/or provides predictive modeling-based computing resource allocation hereunder.

Along these lines, engine 70 may perform multiple functions similar to a general-purpose computer. Specifically, among other functions, engine 70 may (among other things): receive a set of data feeds 74A-N; determine network traffic based on the set of data feeds 74A-N (e.g., social networking feeds); generate a set of graphical curves 80A-N based on the network traffic (e.g., for storage in one or more computer storage devices 78); access a set of graphical curves 80A-N of network data traffic versus time; segment the set of graphical curves 80A-N into a set of predetermined time intervals to yield a set of time interval curves 82A-N; overlay and fit the set of time interval curves 82A-N to yield a set of best fit overlaying curves; generate a derivative vector plot 84 (e.g., a $K^{th}$ derivative vector plot) based on a set of data points of the set of best fit overlaying curves; integrate K initial conditions of a K quantity of times using a predetermined numerical technique (e.g., a fourth order Runge-Kutta technique); forecast network traffic in the networked computing environment 86 based on derivative vector plot 84; provision a set of computing resources 88A-N in the networked computing environment based on the forecasted network traffic; and/or output a network traffic projection 90 based on the forecasting.

As can be seen, embodiments of the present invention utilize concepts of predictive modeling and forecasting, vector fields, and/or derivatives. These concepts will be further described below:

Predictive Models and Forecasting

Predictive models analyze past performance to assess the likelihood of a specific event to occur in the future. Similarly, forecasting is the process of making statements about events whose actual outcomes typically have not yet been observed. This category also encompasses models that seek out subtle data patterns for future forecasting. Predictive models often perform calculations during live transactions, and with the advancement in computing speed, modeling systems can effectively be used for forecasting or predictions.

Vector Fields and Derivatives

In calculus, a vector field, or plot, is an assignment of a vector to each point in a subset of Euclidean space. A vector plot in the plane, for instance, may be visualized as a collection of arrows with a given magnitude and direction attached to each point in the plane. In calculus, a derivative is a measurement of how a function changes as its inputs change. A derivative may be thought of as how much one quantity is changing in response to changes in some other quantity. For example, the derivative of a position of a moving object with respect to time is the object's instantaneous velocity. The elements of differential and integral calculus extend to vector fields in a natural way. Vector fields may be thought of as representing the velocity of a moving flow in space.

Illustrative Example

The embodiments of the present invention may be understood with the following example. It is understood, however, that this example is intended to be illustrative only and not limiting the teachings recited herein. Assume in this example that an events private cloud is provided that is tasked with developing the infrastructure to deliver brand critical web sites such as IBM.com (IBM and related terms are trademarks of International Business Machines Corporation in the United States and/or other countries) to a major sporting event. The embodiments discussed herein may utilize historical web access logs from the duration of such respective events, and generate a $K^{th}$ derivative vector plot that is used to provide forecasts of future similar events. The embodiments of the present invention may enable cloud environments to predict required resource allocations, allocate those resources as required, and modify those resources continuously and accurately.

Along these lines, embodiments of the present invention may utilize mathematical measures, such as differential and integral calculus, and error minimization to generate a $K^{th}$ derivative vector plot. The plot may then be utilized to generate a resource utilization/allocation projection/plan. This may be accomplished as follows:
1. Using each individual day's traffic, create an aggregate best fitting overlay. This may be achieved by minimizing the error in fitting the curves for each day's traffic by using the following steps:
    A. Splice/segment the historical traffic into individual periods. For example, in the events private cloud, the historical traffic may be spliced on local minimums.
    B. Overlay the resulting curves and minimize the error in fitting the curves. For example, in the events private cloud, an error function may be defined as the integral of the square of the ordinate distance between interpolated traffic curves. This may be minimized by varying curve characteristics. More specifically, the events private cloud may use Powell Optimization to minimize the error by altering the amplitudes of the traffic curves, shifting the abscissae, and shifting the ordinates.
    C. Maintain the characteristics that are pertinent by reverting their alterations. For example, in the events private cloud, only the abscissa shift is reflected in the final overlay. The ordinate shift and amplitude changes are reverted.
2. Generate a $K^{th}$ derivative vector for each point on each best-fit overlaying curve. Then, superimpose the vectors onto a unified vector plot at their respective initial abscissa and ordinate. For example, in the events private cloud, a second derivative vector plot is generated from all relevant historical event data.

Forecasting

Based on the generated $K^{th}$ derivative vector plot, the embodiments may then process real time web access log data. The vector plot may take the volume and trend (direction) of the current log data as inputs to output an instantaneous traffic projection for the next period. This may be achieved by taking K initial conditions and integrating K times using a numerical integration technique. For example, in the events private cloud, the current position (abscissa, ordinate) and velocity (slope) are used as initial conditions and a fourth order Runge-Kutta method is applied to the vector plot with sufficiently small time change ($\Delta t$) and carried out over a predetermined period (e.g., 24 hours).

Fourth Order Runge-Kutta Method

As indicated above, a $4^{th}$ order Runge-Kutta method (RK4) may be utilized hereunder. Shown below is a brief description of this method.

Let an initial value problem be specified as follows.

$$\dot{y}=f(t,y), y(t_0)=y_0.$$

This expression generally means that the rate at which y changes is a function of y itself and of t (time). At the start, time is $t_0$ and y is $y_0$. In the equation, y may be a scalar or a vector. The RK4 method for this problem may be given by the following equations:

$$y_{n+1} = y_n + \frac{1}{6}(k_1 + 2k_2 + 2k_3 + k_4)$$

$$t_{n+1} = t_n + h$$

where $y_{n+1}$ is the RK4 approximation of $y(t_{n+1})$, and $$k_1 = hf(t_n, y_n),$$

$$k_2 = hf\left(t_n + \frac{1}{2}h, y_n + \frac{1}{2}k_1\right),$$

$$k_3 = hf\left(t_n + \frac{1}{2}h, y_n + \frac{1}{2}k_2\right),$$

$$k_4 = hf(t_n + h, y_n + k_3).$$

Thus, the next value ($y_{n+1}$) is determined by the present value ($y_n$) plus the weighted average of four increments, where each increment is the product of the size of the interval h, and an estimated slope specified by function $f$ on the right-hand side of the differential equation. The variables indicated above may be defined as follows:
 $k_1$ is the increment based on the slope at the beginning of the interval, using $y_2$ (e.g., Euler's method);
 $k_2$ is the increment based on the slope at the midpoint of the interval, using $$y_n + \frac{1}{2}k_1;$$

$k_3$ is again the increment based on the slope at the midpoint, but now using $$y_n + \frac{1}{2}k_2;$$

and
 $k_4$ is the increment based on the slope at the end of the interval, using $y_n+k_3$, In averaging the four increments, greater weight is given to the increments at the midpoint. The weights are chosen such that if $f$ is independent of y, so that the differential equation is equivalent to a simple integral, then RK4 is Simpson's rule. The RK4 method is a fourth-order method, meaning that the error per step is on the order of $h^5$, while the total accumulated error has order $h^4$.

Derivation of Fourth Order Runge-Kutta Method

In general a Runge-Kutta method of order $\epsilon$ can be written as:

$$y_{t+h} = y_t + h \cdot \sum_{i=1}^{s} a_i k_i + O(h^{s+1})$$

where:

$$k_i = f\left(y_t + h \cdot \sum_{j=1}^{s} \beta_{ij} k_j, t_n - \alpha_i h\right)$$

are increments obtained evaluating the derivatives of $y_t$ at the i-th order. We develop the derivation for the Runge-Kutta fourth order method using the general formula with s=4 evaluated, as explained above, at the starting point, the midpoint and the end point of any interval (t,t+h), thus we choose:

| $\alpha_i$ | $\beta_i$ |
|---|---|
| $\alpha_1 = 0$ | $\beta_{21} = \frac{1}{2}$ |
| $\alpha_2 = \frac{1}{2}$ | $\beta_{32} = \frac{1}{2}$ |
| $\alpha_3 = \frac{1}{2}$ | $\beta_{43} = 1$ |
| $\alpha_4 = 1$ | | and $\beta_{ij}=0$ otherwise. We begin by defining the following quantities:

$$y_{t+h}^1 = y_t + hf(y_t, t)$$

$$y_{t+h}^2 = y_t + hf\left(y_{t+h/2}^1, t + \frac{h}{2}\right)$$

$$y_{t+h}^3 = y_t + hf\left(y_{t+h/2}^2, t + \frac{h}{2}\right)$$

where $$y_{t+h/2}^1 = \frac{y_t + y_{t+h}^1}{2}$$

and $$y_{t+h/2}^2 = \frac{y_t + y_{t+h}^2}{2}$$

If we define:

$$k_1 = f(y_t, t)$$

$$k_2 = f\left(y_{t+h/2}^1, t + \frac{h}{2}\right)$$

$$k_3 = f\left(y_{t+h/2}^2, t + \frac{h}{2}\right)$$

$$k_4 = f(y_{t+h}^3, t + h)$$

and for the previous relations we can show that the following equalities holds up to $\mathcal{O}(h^2)$:

$$k_2 = f\left(y_{t+h/2}^1, t + \frac{h}{2}\right)$$

$$= f\left(y_t + \frac{h}{2}k_1, t + \frac{h}{2}\right)$$

$$= f(y_t, t) - \frac{h}{2}\frac{d}{dt}f(y_t, t)$$

$$k_3 = f\left(y_{t+h/2}^2, t + \frac{h}{2}\right)$$

$$= f\left(y_t + \frac{h}{2}f\left(y_t + \frac{h}{2}k_1, t + \frac{h}{2}\right), t + \frac{h}{2}\right)$$

$$= f(y_t, t) - \frac{h}{2}\frac{d}{dt}\left[f(y_t, t) + \frac{h}{2}\frac{d}{dt}f(y_t, t)\right]$$

$$k_4 = f(y_{t+h}^3, t \mid h)$$

$$= f\left(y_t \mid hf\left(y_t \mid \frac{h}{2}k_2, t \mid \frac{h}{2}\right), t \mid h\right)$$

$$= f\left(y_t + hf\left(y_t + \frac{h}{2}f\left(y_t + \frac{h}{2}f(y_t, t), t + \frac{h}{2}\right), t + \frac{h}{2}\right), t + h\right)$$

$$= f(y_t, t) - h\frac{d}{dt}\left[f(y_t, t) + \frac{h}{2}\frac{d}{dt}\left[f(y_t, t) + \frac{h}{2}\frac{d}{dt}f(y_t, t)\right]\right]$$

where:

$$\frac{d}{dt}f(y_t, t) = \frac{\partial}{\partial y}f(y_t, t)\dot{y}_t + \frac{\partial}{\partial t}f(y_t, t) = f_y(y_t, t)\dot{y} + f_t(y_t, t) := \ddot{y}_t$$

is the total derivative of $f$ with respect to time. If we now express the general formula using what we just derived, we obtain:

$$y_{t+h} = y_t \left| h\left\{a \cdot f(y_t, t) \left| b \cdot \left[f(y_t, t) \left| \frac{h}{2}\frac{d}{dt}f(y_t, t)\right]\right] + c \cdot\right.\right.$$

$$\left[f(y_t, t) + \frac{h}{2}\frac{d}{dt}\left[f(y_t, t) + \frac{h}{2}\frac{d}{dt}f(y_t, t)\right]\right] ++$$

$$d \cdot \left[f(y_t, t) + h\frac{d}{dt}\left[f(y_t, t) + \frac{h}{2}\frac{d}{dt}\left[f(y_t, t) + \frac{h}{2}\frac{d}{dt}f(y_t, t)\right]\right]\right]\right\} +$$

$$O(h^5) = y_t + a \cdot hf_t + b \cdot hf_t + b \cdot \frac{h^2}{2}\frac{df_t}{dt} +$$

$$c \cdot hf_t + c \cdot \frac{h^2}{2}\frac{df_t}{dt} + +c \cdot \frac{h^3}{4}\frac{d^2 f_t}{dt^2} + d \cdot hf_t +$$

$$d \cdot h^2\frac{df_t}{dt} + d \cdot \frac{h^3}{2}\frac{d^2 f_t}{dt^2} + d \cdot \frac{h^4}{4}\frac{d^3 f_t}{dt^3} + O(h^5)$$

and comparing this with the Taylor series of $y_{t+h}$ around $y_t$:

$$y_{t+h} = y_t + h\dot{y}_t + \frac{h^2}{2}\ddot{y}_t + \frac{h^3}{6}y_t^{(3)} + \frac{h^4}{24}y_t^{(4)} + O(h^5) =$$

$$= y_t + hf(y_t, t) + \frac{h^2}{2}\frac{d}{dt}f(y_t, t) -$$

-continued
$$\frac{h^3}{6}\frac{d^2}{dt^2}f(y_t, t) + \frac{h^4}{24}\frac{d^3}{dt^3}f(y_t, t)$$

we obtain a system of constraints on the coefficients:

$$\begin{cases} a+b+c+d = 1 \\ \frac{1}{2}b+\frac{1}{2}c+d = \frac{1}{2} \\ \frac{1}{4}c+\frac{1}{2}d = \frac{1}{6} \\ \frac{1}{4}d = \frac{1}{24} \end{cases}$$

which solved gives $$a = \frac{1}{6},$$
$$b = \frac{1}{3},$$
$$c = \frac{1}{3},$$
$$d = \frac{1}{6}$$

as stated above. It is understood that these computations/algorithms are typically performed/calculated by engine 70.

Figure 5:
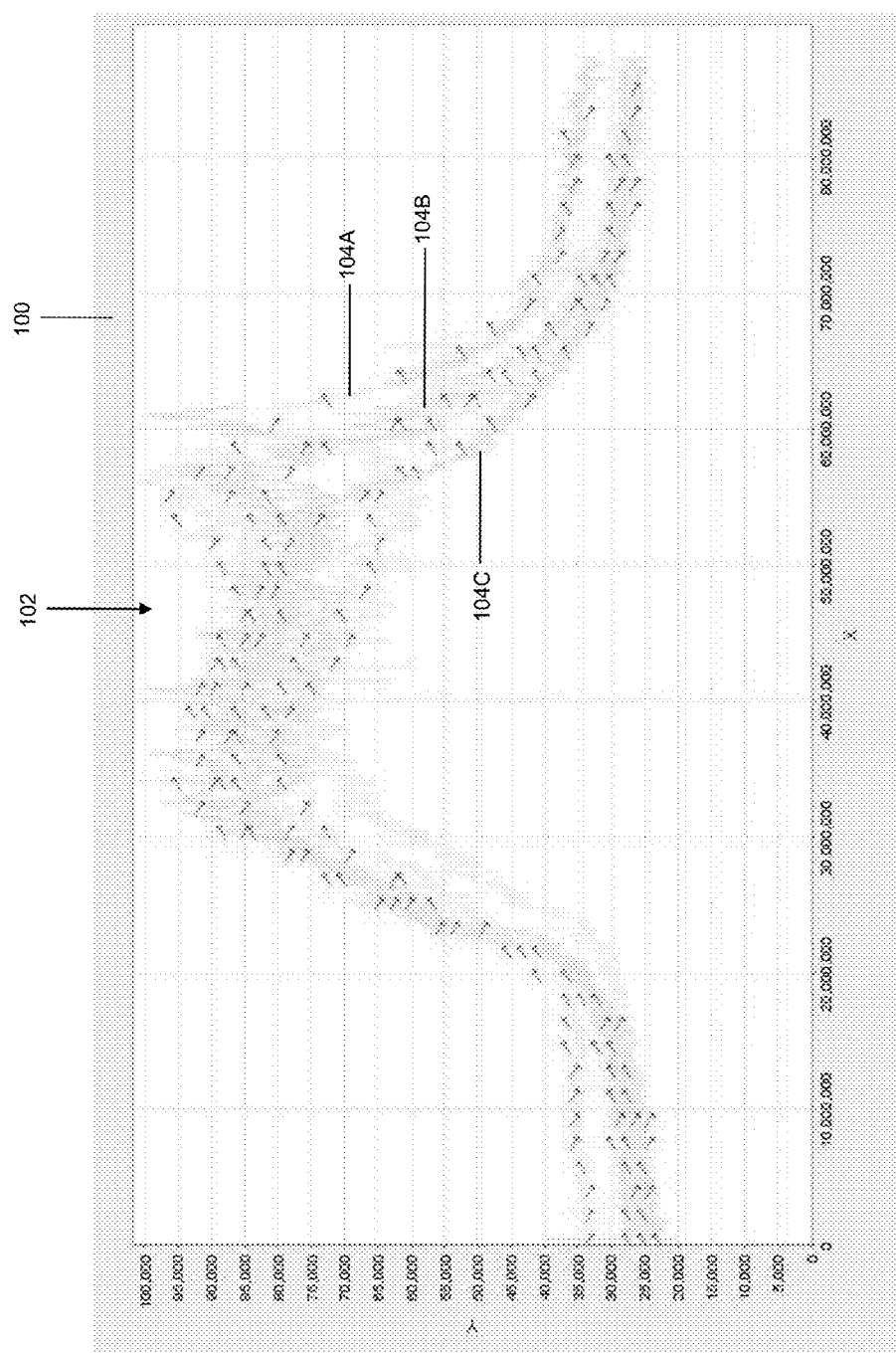
FIG. 5 depicts a set of overlaid plots/curves according to an embodiment of the present invention.

Referring now to FIG. 5, a graph 100 of network traffic rate of requests per minute (y-axis) versus time (x-axis) is shown. In general, graph 100 depicts data points 102 for overlaid time segments (e.g., plots/curves 104A-C). Segments 104A-C may pertain to a common time period occurring in consecutive days, weeks, months, etc. By overlaying and fitting plots/curves 104A-C, data outliers may be reduced and a more accurate depiction of network traffic versus time may be obtained. Specifically, graph 100 represents a second derivative vector that is created at multiple points over each of a set of daily traffic plots 104A-C (e.g., corresponding to 82A-N of FIG. 4). Each of the plots 104A-C may be superimposed to form a vector field.

Figure 6:
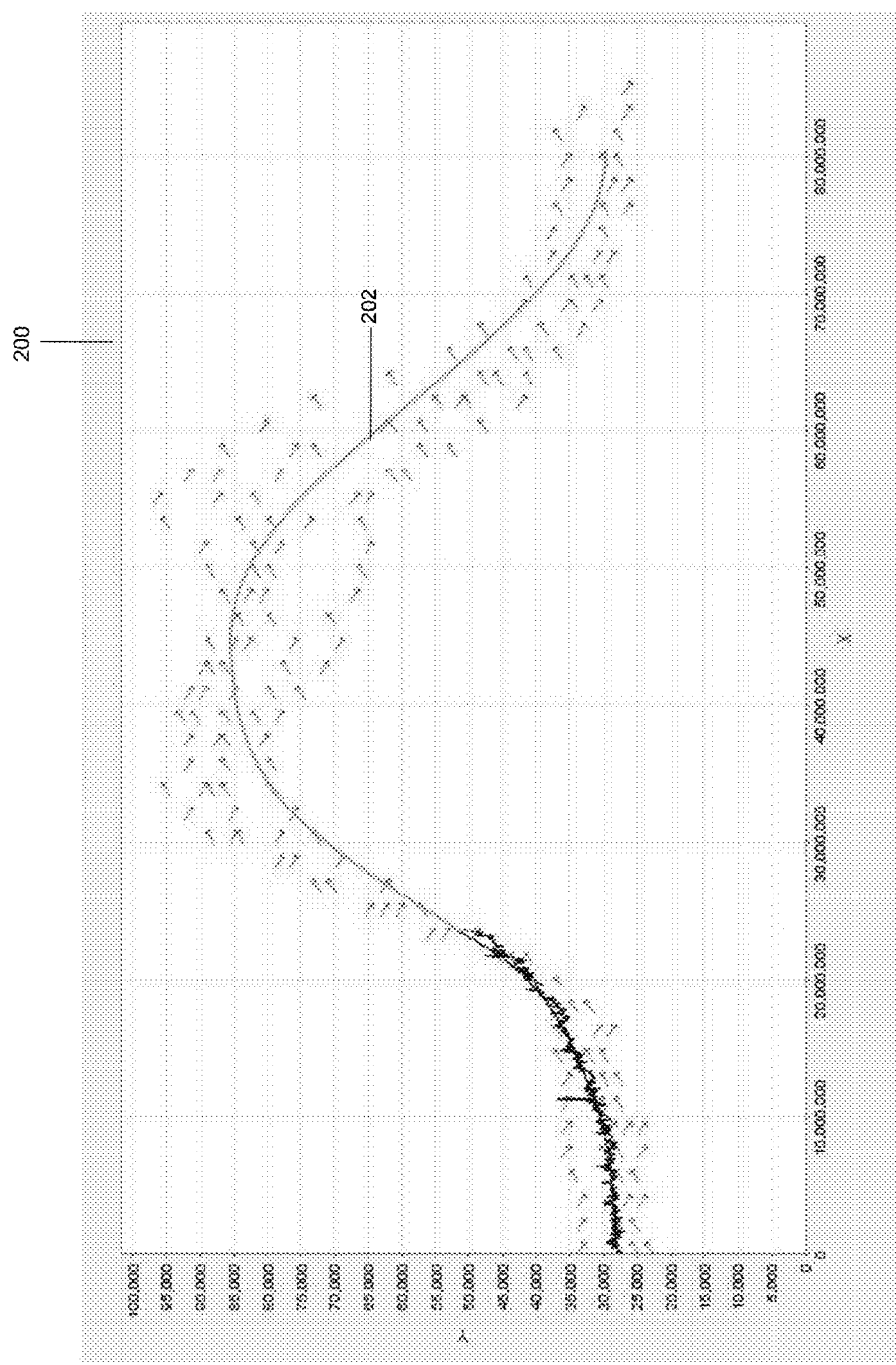
FIG. 6 depicts a derivative vector plot according to an embodiment of the present invention.

Referring now to FIG. 6, a graph 200 having a single predictive curve/plot 202 is shown. In general, vector plot 200 is generated (e.g., by engine 70 of FIG. 4) by utilizing a fourth-order Runge-Kutta method to integrate over the second-derivative vector plot 100 of FIG. 5 (e.g., with initial conditions specified by the current traffic) to generate a forecast for the remainder of a period to be generated. Curve 202 allows potential future network traffic to be forested (e.g., extrapolated).

Figure 7:
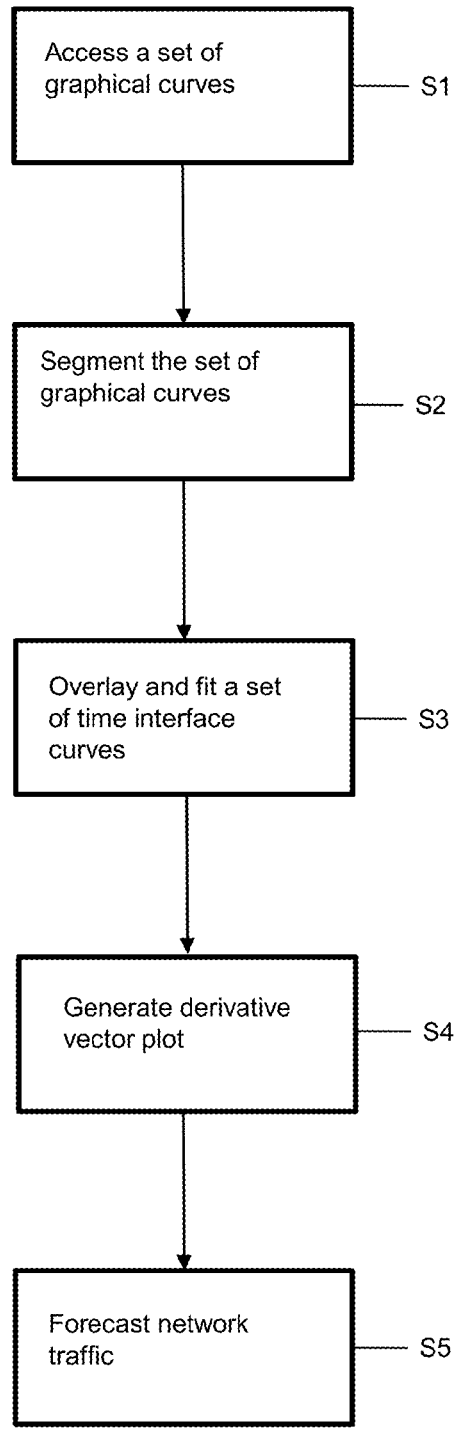
FIG. 7 depicts a method flow diagram according to an embodiment of the present invention The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

Referring now to FIG. 7, a method flow diagram according to an embodiment of the present invention is depicted. In step S1, a set of graphical curves of network data traffic versus time is accessed. The set of graphical curves may be stored in at least one computer storage devices. In step S2, the set of graphical curves is segmented into a set of predetermined time intervals to yield a set of time interval curves. In step S3, the set of time interval curves will be overlaid and fitted to yield a set of best fit overlaying curves. In step S4, a derivative vector plot will be generated based on a set of data points of the set of best fit overlaying curves. In step S5, network traffic in the networked computing environment will be forecasted based on the derivative vector plot.

While shown and described herein as a predictive modeling-based resource allocation solution, it is understood that the invention further provides various alternative embodiments. For example, in one embodiment, the invention provides a computer-readable/useable medium that includes computer program code to enable a computer infrastructure to provide predictive modeling-based resource allocation functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide predictive modeling-based resource allocation functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for predictive modeling-based resource allocation. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for provisioning computing resources using predictive modeling in a networked computing environment, comprising:
   accessing a set of graphical curves of network data traffic versus time, the set of graphical curves being stored in at least one computer storage device;
   segmenting the set of graphical curves into a set of predetermined time intervals to yield a set of time interval curves;
   overlaying and fitting the set of time interval curves to yield a set of best fit overlaying curves;
   generating a derivative vector plot based on a set of data points of the set of best fit overlaying curves; and
   forecasting network traffic in the networked computing environment based on the derivative vector plot.

2. The computer-implemented method of claim 1, further comprising provisioning a set of computing resources in the networked computing environment based on the forecasted network traffic.

3. The computer-implemented method of claim 1, the derivative vector plot comprising a $K^{th}$ derivative vector plot being generated by transforming the set of data points using a mathematical algorithm.

4. The computer-implemented method of claim 3, further comprising outputting a network traffic projection based on the forecasting.

5. The computer-implemented method of claim 4, the network traffic projection being generated by integrating K initial conditions a K quantity of times using a predetermined numerical technique.

6. The computer-implemented method of claim 3, the mathematical algorithm comprising a fourth order Runge-Kutta method.

7. The computer-implemented method of claim 1, the networked computing environment comprising a cloud computing environment.

8. A system for provisioning computing resources using predictive modeling in a networked computing environment, comprising:
   a memory medium comprising instructions;
   a bus coupled to the memory medium; and
   a processor coupled to the bus that when executing the instructions causes the system to:
   access a set of graphical curves of network data traffic versus time, the set of graphical curves being stored in at least one computer storage device;
   segment the set of graphical curves into a set of predetermined time intervals to yield a set of time interval curves;
   overlay and fit the set of time interval curves to yield a set of best fit overlaying curves;
   generate a derivative vector plot based on a set of data points of the set of best fit overlaying curves; and
   forecast network traffic in the networked computing environment based on the derivative vector plot.

9. The system of claim 8, the memory medium further comprising instructions for causing the system to provision a set of computing resources in the networked computing environment based on the forecasted network traffic.

10. The system of claim 8, the derivative vector plot comprising a $K^{th}$ derivative vector plot, the memory medium further comprising instructions for causing the system to transforming the set of data points using a mathematical algorithm to yield the $K^{th}$ derivative vector plot.

11. The system of claim 10, the memory medium further comprising instructions for causing the system to output a network traffic projection based on the forecasting.

12. The system of claim 11, the network traffic projection being generated by integrating K initial conditions of a K quantity of times using a predetermined numerical technique.

13. The system of claim 10, the mathematical algorithm comprising a fourth order Runge-Kutta method.

14. The system of claim 8, the networked computing environment comprising a cloud computing environment.

15. A computer program product for provisioning computing resources using predictive modeling in a networked computing environment, the computer program product comprising a computer readable storage device, and program instructions stored on the computer readable storage device, to:
   access a set of graphical curves of network data traffic versus time, the set of graphical curves being stored in at least one computer storage device;
   segment the set of graphical curves into a set of predetermined time intervals to yield a set of time interval curves;
   overlay and fit the set of time interval curves to yield a set of best fit overlaying curves;
   generate a derivative vector plot based on a set of data points of the set of best fit overlaying curves; and
   forecast network traffic in the networked computing environment based on the derivative vector plot.

16. The computer program product of claim 15, the computer readable storage media further comprising instructions to provision a set of computing resources in the networked computing environment based on the forecasted network traffic.

17. The computer program product of claim 15, the derivative vector plot comprising a $K^{th}$ derivative vector plot, the computer readable storage media further comprising instructions to transforming the set of data points using a mathematical algorithm to yield the $K^{th}$ derivative vector plot.

18. The computer program product of claim 17, the computer readable storage media further comprising instructions to output a network traffic projection based on the forecasting.

19. The computer program product of claim 18, the network traffic projection being generated by integrating K initial conditions a K quantity of times using a predetermined numerical technique.

20. The computer program product of claim 17, the mathematical algorithm comprising a fourth order Runge-Kutta method.

21. The computer program product of claim 15, the networked computing environment comprising a cloud computing environment.

22. A method for deploying a system for provisioning computing resources using predictive modeling in a networked computing environment, comprising:
  providing a computer infrastructure being operable to:
    access a set of graphical curves of network data traffic versus time, the set of graphical curves being stored in at least one computer storage device;
    segment the set of graphical curves into a set of predetermined time intervals to yield a set of time interval curves;
    overlay and fit the set of time interval curves to yield a set of best fit overlaying curves;
    generate a derivative vector plot based on a set of data points of the set of best fit overlaying curves; and
    forecast network traffic in the networked computing environment based on the derivative vector plot.

\* \* \* \* \*